United States Patent
Feng et al.

(10) Patent No.: US 6,596,042 B1
(45) Date of Patent: Jul. 22, 2003

(54) METHOD OF FORMING PARTICLES FOR USE IN CHEMICAL-MECHANICAL POLISHING SLURRIES AND THE PARTICLES FORMED BY THE PROCESS

(75) Inventors: Xiangdong Feng, Broadview Heights, OH (US); Yie-Shein Her, Canandaigua, NY (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/992,485

(22) Filed: Nov. 16, 2001

(51) Int. Cl.⁷ .............. C09K 3/14; C09G 1/02; C09G 1/04
(52) U.S. Cl. .............. 51/309; 51/307; 106/3; 423/263
(58) Field of Search .............. 51/307, 309; 106/3; 438/692, 693; 252/79.1; 216/89; 423/263

(56) References Cited

U.S. PATENT DOCUMENTS

| | | | |
|---|---|---|---|
| 3,429,080 A | 2/1969 | Lachapelle | 51/309 |
| 4,601,755 A | 7/1986 | Melard et al. | 106/3 |
| 4,786,325 A | 11/1988 | Melard et al. | 106/3 |
| 5,002,747 A | 3/1991 | Le Loarer | 423/592 |
| 5,011,671 A | 4/1991 | Le Loarer | 423/592 |
| 5,279,789 A | 1/1994 | Le Loarer et al. | 423/21.1 |
| 5,389,352 A | 2/1995 | Wang | 423/263 |
| 5,759,917 A | 6/1998 | Grover et al. | 438/690 |
| 5,891,412 A | 4/1999 | Le Loarer et al. | 423/263 |
| 5,897,675 A | 4/1999 | Mangold et al. | 51/309 |
| 5,962,343 A | 10/1999 | Kasai et al. | 438/693 |
| 6,120,571 A | 9/2000 | Aihara et al. | 51/309 |
| 6,221,118 B1 | 4/2001 | Yoshida et al. | 51/309 |

FOREIGN PATENT DOCUMENTS

EP 0875547 A2 11/1998

OTHER PUBLICATIONS

Lakhwani et al., "Hydrothermal coarsening of CeO2 particles," 1999 Materials Research Society, J. Mater. Res., vol. 14, No. 4, Apr. 1999, pp. 1455–1461.

*Primary Examiner*—Michael Marcheschi
(74) *Attorney, Agent, or Firm*—Rankin, Hill, Porter & Clark LLP

(57) ABSTRACT

The present invention provides a process for producing particles suitable for use as abrasives in chemical-mechanical polishing slurries. The process according to the invention includes adding a crystallization promoter such as $Ti[OCH(CH_3)_2)]_4$ to an aqueous cerium salt solution, adjusting the pH of the solution to higher than 7.0 using one or more bases, and subjecting the solution to hydrothermal treatment at a temperature of from about 90° C. to about 500° C. to produce the particles.

13 Claims, 1 Drawing Sheet

METHOD OF FORMING PARTICLES FOR USE IN CHEMICAL-MECHANICAL POLISHING SLURRIES AND THE PARTICLES FORMED BY THE PROCESS

FIELD OF INVENTION

The present invention provides a process for producing particles suitable for use as abrasives in chemical-mechanical polishing slurries and particles formed according to the process.

BACKGROUND OF THE INVENTION

Chemical-mechanical polishing (CMP) slurries are used, for example, to planarize surfaces during the fabrication of semiconductor chips and the like. CMP slurries typically include chemical etching agents and abrasive particles dispersed in a liquid carrier. The abrasive particles perform a grinding function when pressed against the surface being polished using a polishing pad.

It is well known that the size, composition, and morphology of the abrasive particles used in a CMP slurry can have a profound effect on the polishing rate. Over the years, CMP slurries have been formulated using abrasive particles formed of, for example, alumina ($Al_2O_3$), ceric oxide ($CeO_2$), iron oxide ($Fe_2O_3$), silica ($SiO_2$), silicon carbide (SiC), silicon nitride ($Si_3N_4$), tin oxide ($SnO_2$), titania ($TiO_2$), titanium carbide (TiC), tungstic oxide ($WO_3$), yttria ($Y_2O_3$), zirconia ($ZrO_2$), and combinations thereof. Of these oxides, ceric oxide ($CeO_2$) is the most efficient abrasive in CMP slurries for planarizing silicon dioxide insulating layers in semiconductors because of its high polishing activity.

Calcination is by far the most common method of producing abrasive particles for use in CMP slurries. During the calcination process, precursors such as carbonates, oxalates, nitrates, and sulphates, are converted into their corresponding oxides. After the calcination process is complete, the resulting oxides must be milled to obtain particle sizes and distributions that are sufficiently small to prevent scratching.

The calcination process, although widely used, does present certain disadvantages. For example, it tends to be energy intensive and thus relatively expensive. Toxic and/or corrosive gaseous byproducts can be produced during calcination. In addition, it is very difficult to avoid the introduction of contaminants during the calcination and subsequent milling processes. Finally, it is difficult to obtain a narrow distribution of appropriately sized abrasive particles.

It is well known that CMP slurries containing contaminants and/or over-sized abrasive particles can result in undesirable surface scratching during polishing. While this is less critical for coarse polishing processes, in the production of critical optical surfaces, semiconductor wafers, and integrated circuits, defect-free surfaces are required. This is achievable only when the abrasive particles are kept below about 1.0 µm in diameter and the CMP slurry is free of contaminants. The production of abrasive particles meeting these requirements by conventional calcination and milling techniques is extremely difficult and often not economically feasible.

An alternative method of forming abrasive particles for use in CMP slurries is hydrothermal synthesis, which is also known as hydrothermal treatment. In this process, basic aqueous solutions of metal salts are held at elevated temperatures and pressures for varying periods of time to produce small particles of solid oxide suspended in solution. A methods of producing ceric oxide ($CeO_2$) particles via hydrothermal treatment is disclosed, for example, in Wang, U.S. Pat. No. 5,389,352.

The production of abrasive particles by hydrothermal treatment provides several advantages over the calcination/milling process. Unfortunately, however, abrasive particles formed by conventional hydrothermal treatment processes tend not to provide desired high polishing rates.

SUMMARY OF INVENTION

The present invention provides a process for producing particles suitable for use as abrasives in chemical-mechanical polishing slurries. The process comprises adding a crystallization promoter such as titanium(IV) isopropoxide to an aqueous cerium salt solution, adjusting the pH to higher than 7.0 using one or more bases, and subjecting the solution to hydrothermal treatment at a temperature of from about 90° C. to about 500° C. to produce particles. Although the precise mechanism is not yet precisely understood, the presence of a crystallization promoter in the solution during hydrothermal treatment results in the formation of particles with larger than expected crystallite sizes. Particles formed in this manner polish surfaces at a much higher rate than particles formed by conventional hydrothermal processes.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

Figure 1:
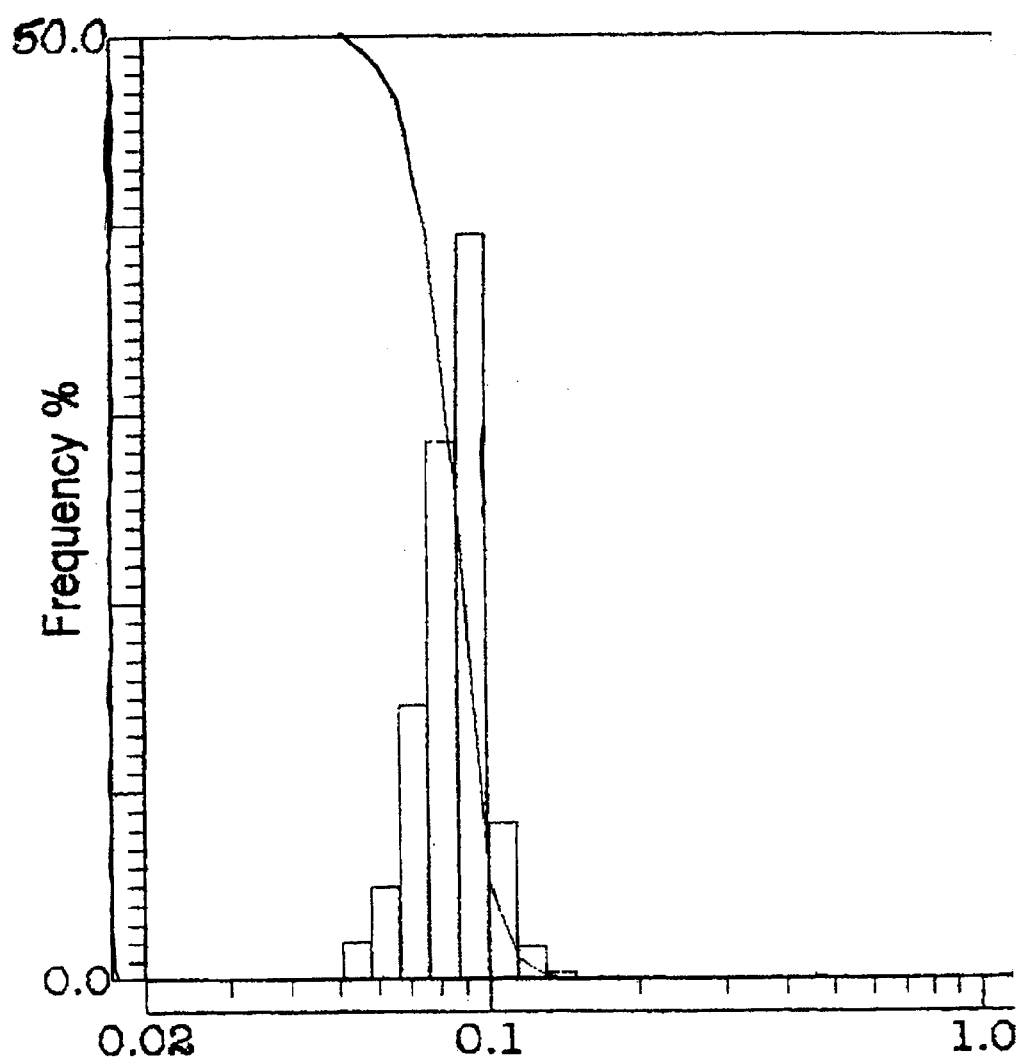
FIG. 1 is a graph showing the particle size distribution of particles formed in Example 1.

The present invention provides a process for producing particles suitable for use as abrasives in chemical-mechanical polishing slurries without the need for calcination and/or milling. The process comprises adding a crystallization promoter to an aqueous cerium salt solution, adjusting the pH to higher than 7.0 using one or more bases, and subjecting the solution to hydrothermal treatment at a temperature of from about 90° C. to about 500° C. to produce particles.

The preferred cerium salt for use in the method according to the invention is $(NH_4)_2Ce(NO_3)_6$ (ammonium cerium(IV) nitrate). However, it will be appreciated that other water soluble cerium salts can also be used. The valence of the cerium in the cerium salt is not per se critical, but ceric(IV) salts are preferred over cerous(III) salts. Suitable cerium salts for use in the invention include, for example, cerium nitrate, cerium chloride, cerium sulfate, cerium bromide, and cerium iodide.

The solution must also comprise one or more crystallization promoters. The presently most preferred crystallization promoter is a titanium compound, namely $Ti[OCH(CH_3)_2]_4$ (titanium(IV) isopropoxide). Other titanium compounds can be used, such as, for example, titanium chloride, titanium sulfate, titanium bromide, and titanium oxychloride. Use of a crystallization promoter is essential in order to obtain particles having a relatively large crystallite size.

It is possible to use compounds of metals other than titanium such as, for example, salts of lanthanum, scandium, and/or aluminum, as crystallization promoters in accordance with the invention. Scandium salts, in particular, can be used to produce cerium oxide particles according to the process that have relatively large crystallite sizes. However, for reasons which are presently unknown, particles formed using scandium compounds as crystallization promoters are not as effective as abrasives in CMP polishing applications as compared to particles formed using titanium compounds as crystallization promoters.

One or more bases must be added to raise the pH of the solution to above 7.0 and assist in the formation of a solution having a gel-like consistency. Suitable bases include, for example, ammonium hydroxide, organoamines such as ethyl amine and ethanol amine, and/or polyorganoamines such as polyethylene imine. Other compounds such as urea can also be added to assist in crystal growth. The gel-like solution will break down into small particles upon rapid stirring.

The gel-like solution is then subject to hydrothermal treatment. This is typically accomplished by transferring the solution to a stainless steel vessel, sealing the vessel, and then heating the solution in an oven to a temperature of from about 90° C. to about 500° C. for a period of time from about 10 minutes to many hours. At the completion of the reaction, the stainless steel vessel can be quenched in cold water, or it can be permitted to cool gradually over time. The solution can, but need not be, stirred during hydrothermal treatment. It is also possible to carry out the reaction in an autoclave unit with constant stirring.

Testing has shown that the average particle size (diameter) of the particles can be controlled by varying the initial concentration of the cerium salt: the higher the initial cerium ion concentration, the larger the particles produced. Use of additives such as urea tends to produce smaller particles. Reaction time, temperature, and pH appear to have little or no effect on particle size. A range of particle sizes from about 5 nm to about 1000 nm can be obtained via the process, but particles having an average diameter within the range of from about 50 nm to about 250 nm are most preferred.

Although the mechanism is not fully known at this time, for some reason the presence of a crystallization promoter such as $Ti[OCH(CH_3)_2)]_4$ (titanium(IV) isopropoxide) is critical in order to produce abrasive particles having a large crystallite size, which can be determined using well-known X-ray diffraction methods. For example, when subjected to identical hydrothermal conditions (i.e., temperature, time, pH, etc.), a solution containing a titanium(IV) isopropoxide crystallization promoter produced particles having an average crystallite size of 210 Å whereas a solution containing no titanium(IV) isopropoxide crystallization promoter produced particles having a an average crystallite size of only 42 Å. For some reason, the presence of a crystallization promoter in the solution accelerates the crystal growth of crystallites during hydrothermal treatment. This is desirable, because CMP slurries formed using particles having larger crystallite sizes tend to polish surfaces such as tetraethoxy-orthosilicate (TEOS) silicon dioxide films at a much higher rate than CMP slurries formed using particles having smaller crystallite sizes.

It will be appreciated that the compounds used as crystallization promoters in the invention tend to rapidly decompose in aqueous media, which reduces their efficiency in promoting the formation of particles having larger crystallite sizes. Accordingly, it is preferable for one or more stabilizing compounds such as, for example, acetyl acetone, to be added with the crystallization promoters in order to prevent or delay the aqueous decomposition of such compounds. When stabilized in this manner, the crystallization promoters have sufficient time to homogeneously mix with the cerium salts at a molecular level before the gel-like solution is formed via the addition of one or more bases. Applicants have discovered that when the crystallization promoters are stabilized in this manner, the particles formed during hydrothermal treatment tend to have substantially larger crystallite sizes.

The particles formed according to the process of the invention are particularly well-suited for use in CMP slurries. CMP slurries can be formed using the particles as obtained via the process or by adding water, acid and/or base to adjust the abrasive concentration and pH to desired levels. Surfaces that can be polished using CMP slurries containing the particles according to the invention include, but are not limited to TEOS silicon dioxide, spin-on glass, organosilicates, silicon nitride, silicon oxynitride, silicon, silicon carbide, computer memory hard disk substrates, silicon-containing low-k dielectrics, and silicon-containing ceramics.

The following examples are intended only to illustrate the invention and should not be construed as imposing limitations upon the claims.

EXAMPLE 1

In a 1000 ml plastic bottle, 41.6 grams of $(NH_4)_2Ce(NO_3)_6$ (ammonium cerium(IV) nitrate) was dissolved in 500 ml deionized, distilled $H_2O$ (DI-water) and 1.2 grams $CH_3COCH_2OCCH_3$ (acetyl acetone) to form a solution. 2.4 grams of $Ti[OCH(CH_3)_2)]_4$ (titanium(IV) isopropoxide) was added to the solution followed by the addition of 36 grams of $C_2H_5NH_2$ (ethylamine) with stirring. A sufficient quantity of DI-water was then added to reach a final volume of 800 ml. The solution was stirred for 5 minutes and then transferred to a clean 1000 ml stainless steel vessel. The stainless steel vessel was closed, shaken for 5 minutes, and then placed into a furnace and heated at 300° C. for 6.0 hours. The stainless steel vessel was then removed from the furnace and allowed to cool to room temperature. The reaction product formed in the vessel was transferred to a clean 1000 ml plastic bottle. As shown in FIG. 1, the reaction product consisted of a dispersion of $CeO_2$ (cerium oxide) particles having a narrow size distribution ($D_{50}$=87 nm; $D_{90}$=101 nm; and $D_{10}$=68 nm). The cerium oxide particles had an average crystallite size of 210 Å.

EXAMPLE 2

Comparative Example

A dispersion of cerium oxide particles was formed using the same materials and procedures as set forth in Example 1, except that no $Ti[OCH(CH_3)_2)]_4$ (titanium(IV) isopropoxide) was used. The cerium oxide particles thus formed had a narrow size distribution ($D_{50}$=89 nm; and $D_{10}$=72 nm) similar to the cerium oxide particles formed in Example 1, but the average crystallite size was only 42 Å.

EXAMPLE 3

A dispersion of cerium oxide particles was formed using the same materials and procedures as set forth in Example 1, except that no acetyl acetone ($CH_3COCH_2OCCH_3$) was used. The cerium oxide particles thus formed had a narrow size distribution ($D_{50}$=80 nm; $D_{90}$=97 nm; and $D_{10}$=60 nm) similar to the cerium oxide particles formed in Example 1, but the average crystallite size was only 90 Å.

EXAMPLE 4

Four chemical-mechanical polishing slurries were formed using cerium oxide particles. Slurry A consisted of 100 parts by weight of the cerium oxide nanoparticle dispersion formed in Example 1. Slurry B was identical to Slurry A, except that the cerium oxide nanoparticle dispersion formed in Example 2 was used instead of the cerium oxide nanoparticle solution formed in Example 1. Slurry C was identical to Slurry A, except that the cerium oxide nanoparticle dispersion formed in Example 3 was used instead of the cerium oxide nanoparticle solution formed in Example 1. Slurry D was identical to Slurry A, except that the cerium oxide nanoparticle dispersion comprised conventional calcined cerium oxide (Ferro Electronic Materials SRS-616A) having an average particle size of $D_{50}=141$ nm dispersed in water at a pH of 10.0. Identical TEbS $SiO_2$ (silicon dioxide) wafers were polished using Slurries A, B, C, and D, respectively. The polishing was performed using a Strasbaugh 6EC polisher, a Rodel IC1000 pad with Suba IV backing at a down pressure of 3.2 psi, and a table rotation speed of 60 rpm, and slurry flow rate of 150 ml/min. The wafer polished using Slurry A had a $SiO_2$ removal rate of 3500 Å/min and produced a surface having a root-mean-square average roughness of 0.8 Å. The wafer polished using Slurry B had a $SiO_2$ removal rate of 85 Å/min and produced a surface having a root-mean-square average roughness of 1.0 Å. The wafer polished using Slurry C had a $SiO_2$ removal rate of 1875 Å/min and produced a surface having a root-mean-square average roughness of 2.0 Å. And, the wafer polished using Slurry D had a $SiO_2$ removal rate of 4200 Å/min and produced a surface having a root-mean-square average roughness of 3.0 Å.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A process for producing abrasive particles suitable for use in chemical-mechanical polishing slurries comprising adding a crystallization promoter to an aqueous cerium salt solution, adjusting the pH of the solution to above 7.0 using one or more bases, and subjecting said solution to hydrothermal treatment at a temperature of from about 90° C. to about 500° C. to produce said particles.

2. The process as in claim 1 wherein said particles have a mean average particle size ($D_{50}$) within the range of from about 5 nm to about 1000 nm.

3. The process as in claim 1 wherein said particles have an average crystallite size of greater than about 60 Å.

4. The process as in claim 1 wherein said particles have an average crystallite size of greater than about 200 Å.

5. The process as in claim 1 wherein said cerium salt is ammonium cerium(IV) nitrate.

6. The process as in claim 1 wherein said crystallization promoter comprises a titanium compound.

7. The process as in claim 6 wherein said titanium compound is selected from the group consisting of titanium (IV) isopropoxide, titanium chloride, titanium sulfate, titanium bromide, and titanium oxychloride.

8. The process as in claim 6 wherein said titanium compound is titanium(IV) isopropoxide.

9. The process as in claim 1 wherein said crystallization promoter comprises a salt of lanthanum, scandium, aluminum, or a mixture of such salts.

10. The process as in claim 1 wherein said solution further comprises one or more bases selected from the group consisting of ammonium hydroxide, ethyl amine, ethanol amine, and polyethylene imine.

11. The process as in claim 1 wherein said solution further comprises a compound that delays the aqueous decomposition of the crystallization promoter.

12. The process as in claim 11 wherein said compound that delays the aqueous decomposition of the crystallization promoter comprises acetyl acetone.

13. Abrasive particles formed according to the process as in claim 1.

* * * * *